(12) United States Patent
Couture (10) Patent No.: US 7,157,812 B2
(45) Date of Patent: Jan. 2, 2007

(54) APPARATUS AND METHOD FOR MODIFYING A POWER FLOW IN A SECTION OF AN ELECTRIC POWER LINE

(75) Inventor: Pierre Couture, Boucherville (CA)

(73) Assignee: Hydro-Quebec, Quebec (CA)

( * ) Notice: Subject to any disclaimer, the term of this patent is extended or adjusted under 35 U.S.C. 154(b) by 0 days.

(21) Appl. No.: 10/532,032

(22) PCT Filed: Oct. 14, 2003

(86) PCT No.: PCT/CA03/01560

§ 371 (c)(1),
(2), (4) Date: Apr. 21, 2005

(87) PCT Pub. No.: WO2004/038880

PCT Pub. Date: May 6, 2004

(65) Prior Publication Data

US 2006/0044720 A1    Mar. 2, 2006

(30) Foreign Application Priority Data

Oct. 22, 2002    (CA) ................................ 2409284

(51) Int. Cl.
*H02J 3/16* (2006.01)
(52) U.S. Cl. ........................... 307/98; 307/112
(58) Field of Classification Search ............. 307/98
See application file for complete search history.

(56) References Cited

U.S. PATENT DOCUMENTS

| | | | |
|---|---|---|---|
| 4,135,221 A * | 1/1979 | Genrikh et al. ............ 361/1 |
| 6,018,152 A | 1/2000 | Allaire | |
| 6,295,215 B1 * | 9/2001 | Faria et al. .............. 363/37 |
| 6,396,172 B1 | 5/2002 | Couture | |
| 6,411,067 B1 * | 6/2002 | Bjorklund ............... 323/207 |
| 6,486,569 B1 | 11/2002 | Couture | |

FOREIGN PATENT DOCUMENTS

| WO | WO-00/35061 | 6/2000 |
|---|---|---|
| WO | WO-02/41459 | 5/2002 |

\* cited by examiner

*Primary Examiner*—Burton S. Mullins
*Assistant Examiner*—Adi Amrany
(74) *Attorney, Agent, or Firm*—Darby & Darby (57) ABSTRACT

The invention concerns an apparatus and a method for modifying a power flux in an electrical transmission line section (6,8), each section including phase lines having n conductors (10,12) electrically insulated from one another and shorted at the ends (40) of the section. The apparatus comprises a power exchange unit including a power converter (18) for power conversion between first and second pairs of terminals (20,22), the first pair of terminals (20) being connected in series to at least one conductor of the section; and an electrical element (24) connected to the second pair of terminals (22) and adapted to circulate power through the power converter to modify said power flux.

21 Claims, 10 Drawing Sheets

APPARATUS AND METHOD FOR MODIFYING A POWER FLOW IN A SECTION OF AN ELECTRIC POWER LINE

The present invention relates to an apparatus and to a method for modifying a power flow in a segment of an electric power line with multiple phase conductors. In the present text, we will refer to "phase line" to describe what is commonly known by a person skilled in the art as "phase". The apparatus and method are used for modifying the power flow in a segment of an electric power line and also, but not exclusively, de-ice an electric power line, to modify the power flow through an electric power line in a static or dynamic manner, to stabilize an electric power network, to filter harmonics of an electric power line, to absorb or dissipate power transmitted by an electric power line, or even to limit the electric current of an electric power line.

Known in the art, there is U.S. Pat. No. 6,486,569 B2 granted on Nov. 26, 2002, and naming Mr. Pierre COUTURE as inventor, who is also the inventor of the present invention. This patent describes a method of managing a power flow in an electric power network. The method comprises the steps of providing switching units that are mounted on insulated portions of pylons of electric power lines for switching the current of at least one conductor of a plurality of phase conductors that are electrically insulated from one another, said switching of conductors enabling a change of impedance which modulates the power flow. The method also comprises a step of managing the power flow in the segments of the electric power line, by changing the series impedance of the line by controlling switching units.

Also known in the art, there is international publication No. WO 02/41459 A1, published on May 23, 2002, and naming Mr. Pierre COUTURE as inventor, who is also the inventor of the present application. This patent describes a switching apparatus and method for varying the impedance of a phase line of a segment of an electric power line. For each of at least one of the n conductors of the phase line, a passive component and a pair of electromechanical and electronic switches are provided. The pair of switches is adapted to selectively connect and disconnect the passive component in series with the corresponding conductor, in response to control signals. Means are also provided for controlling each pair of switches according to current operation conditions of the phase line.

Also known in the art, there is international publication No. WO 00/35061, published on Jun. 15, 2000, and naming Mr. Pierre COUTURE as inventor, who is also the inventor of the present application. A U.S. patent corresponding to this international application has also been granted on May 28, 2002 under No. U.S. Pat. No. 6,396,172 B1. These documents describe a switching apparatus and method for a segment of an electric power line comprising several phase lines. Each phase line comprising several conductors electrically insulated from one another and connected in parallel for conducting a phase current. Pairs of electromechanical and electronic switches connected in parallel are provided for selectively opening and closing the conductors of each phase line so as to conduct the corresponding phase current through one or several conductors. Control means are also provided for controlling the pairs of electromechanical and electronic switches according to current operating conditions of the segment.

One of the drawbacks that can be found in most of the above-mentioned apparatuses and methods, resides in the fact that the strategies available to the user for modifying the power flow in a segment of an electric power line are limited. Furthermore, the operating speed of these apparatuses is limited according to the frequency of the current circulating in the power line.

One of the objects of the present invention is to propose an apparatus and a method for modifying the power flow in a segment of an electric power line according to a range of possibilities much greater than what is possible in the prior art, in an efficient and safe manner.

Another object of the present invention is to quickly modify the power flow than what is possible in the prior art. Thus, for a power line operating at 60 hertz, the modification of the power flow can be done in a period of time shorter than 8 milliseconds without waiting for the passage of the current by zero.

Another object of the present invention, which is obtained by a preferred embodiment, is to propose an apparatus and a method for modifying a power flow in a segment of an electric power line, so that a power flow of said segment is sent directly towards another segment of the electric power line.

These objects, advantages, and other features of the invention will become more apparent upon the reading of the following non restrictive description, of different preferred embodiments given as examples only, with reference to the attached drawings.

SUMMARY OF THE INVENTION

According to the present invention, there is provided an apparatus for modifying a power flow in a segment of an electric power line, each segment including phase lines each having n conductors electrically insulated from one another and short-circuited at ends of the segment, the apparatus comprising a power exchange unit including: a power converter for converting power between first and second pairs of terminals, the first pair of terminals being connected in series with a conductor of the segment; and an electric component connected to the second pair of terminals and capable of circulating power through the power converter for modifying said power flow.

According to the present invention, there is also provided a method for modifying a power flow in a segment of an electric power line, each the segment having phase lines each having n conductors insulated from one another and short-circuited at ends of the segment, the method comprising the following steps:

DETAILED DESCRIPTION OF THE DRAWINGS

Figure 1:
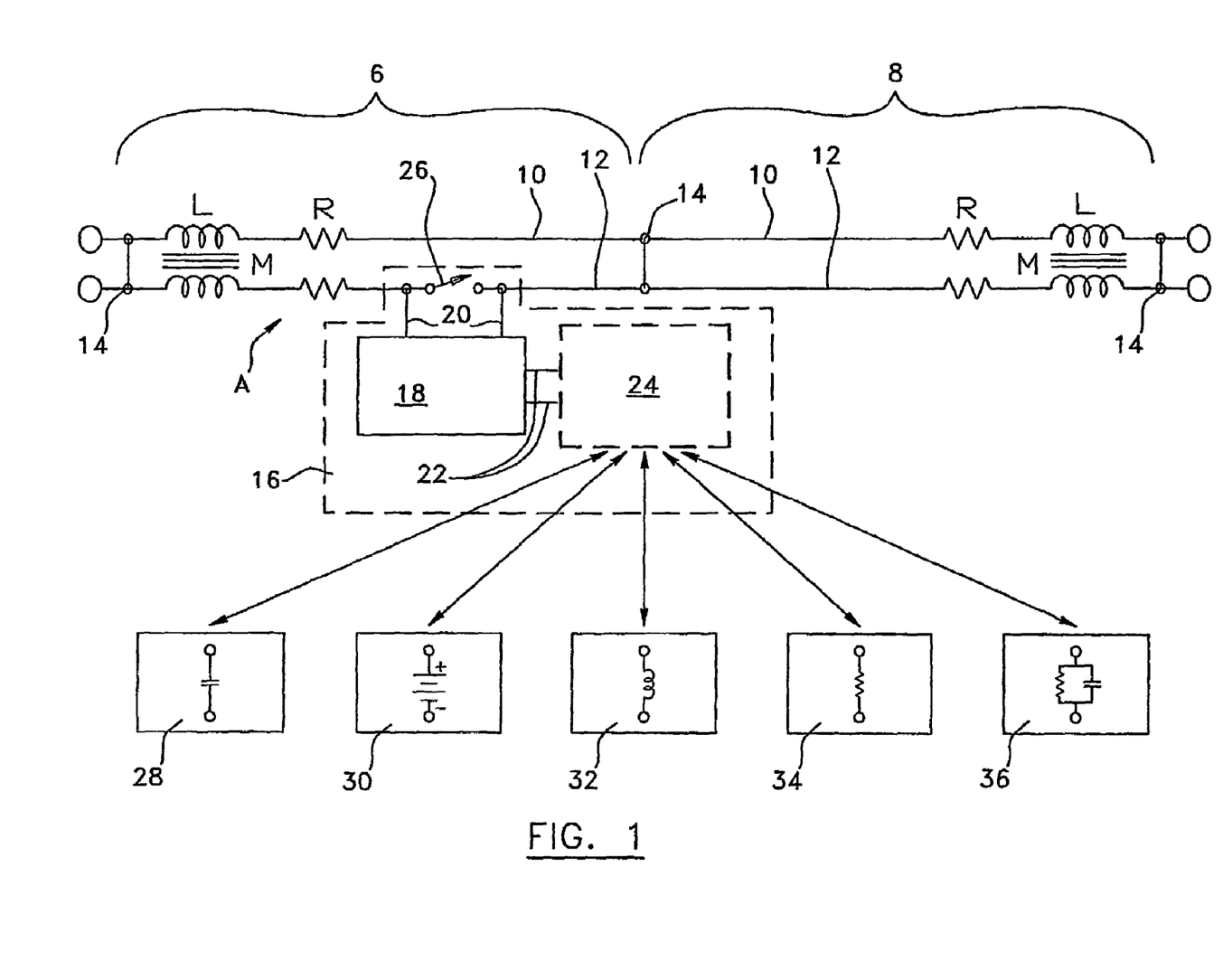
FIG. 1 is a schematic circuit diagram showing two segments of an electric power line, and an apparatus according to a preferred embodiment of the present invention.

Referring now to FIG. 1, there is shown a schematic circuit diagram showing two segments 6 and 8 of an electric power line. An electric power line can of course be segmented into a multitude of segments. Generally, an electric power line comprises three phase lines A, B and C. In this FIG. 1 and in FIGS. 2 to 9, in order to avoid overloading the figures, a single phase line A is shown by segment even if a segment normally comprises several phase lines. Furthermore, it is important to well understand that for each case shown in FIGS. 1 to 9, an apparatus according to the present invention can be installed on each phase line of the segment. Each phase line has n conductors 10 and 12 electrically insulated from one another and short-circuited at ends 14 of each segment. For each segment, a circuit equivalent to the self-inductance L, the mutual inductance M and the resistance R is indicated. For the sake of discussion, the capacitive effects of the line are neglected. The phase line A of the segment 6 is provided with an apparatus according to a preferred embodiment of the present invention.

The apparatus according to the present invention comprises a power exchange unit 16 having a power converter 18 for converting power between first and second pairs of terminals 20 and 22. The pair of terminals 22 is connected in series with at least one conductor 12 of the segment 6. The power exchange unit also includes an electric component 24 connected to the pair of terminals 22. This electric component 24 is capable of circulating power through the power converter 18 for modifying the power flow through the segment 6 of the electric power line. Preferably, the power exchange unit further comprises a switch 26 for selectively connecting and disconnecting the pair of terminals 20 in series with the conductor 12 of the segment 6, in response to control signals. Preferably, the apparatus comprises n−1 power units, n being the number of conductors forming a segment. For example, in the present case, the phase line A of the segment 6 is formed by two conductors hence the number n is equal to 2.

In general, according to this preferred embodiment, the n−1 power units are connectable by means of their switch 26 respectively to n−1 conductors of a phase line belonging to the segment. In the present case, the number of conductors being equal to 2, the power exchange unit is capable of being connected by means of its switch 26 to the conductor 12 of the phase line A being part of the segment 6. Preferably, the electric component 24 is selected among the following electric components: a capacitor 28, a battery 30, an inductance 32, a resistance 34 and a resistance connected in parallel to a capacitor 36. Preferably, the converter 18 is a converter integrated to a phase line of the high-voltage power line.

According to the present invention, preferably, each segment is composed of a transmission line having several phase lines onto which an apparatus according to the present invention is mounted. The line is used as a work head transformer. The converter 18 along with the electric component 24 act as an energy source or drain controllable in voltage or in current. The converter controls the phase, the amplitude and in certain cases the frequency so as to produce functions known under the English appellation "Flexible AC Transmission System" (FACTS). A FACTS carries out a control of the impedance, a stabilization, a filtration, a limitation of current, a braking, etc. The electric component may also fulfill the function of a storage unit when it is carried out for example by a capacitor, a battery, a fuel cell, etc. The replacement of a storage unit by an electric resistance or by a combination of a resistance and a capacitor, which extract active power. The electric resistance can be a variable resistance.

The converter 18 can consist of a simple diode bridge, thyristors or a modulator by variable width pulses (PWM). The switches (not shown) used in the converter can be diodes, thyristors, Insulated Gate Bipolar Transistors (IGBT), Metal-Oxide Semiconductor Field Effect Transistors (MOSFET), Metal-Oxide Semiconductor Controlled Thyristors (MCT), Gate Turn Off Semiconductors (GTO), etc. The converter 18 as well as the electric component 24 are mounted directly on the phase line A of the segment 6 without reference to the ground or to the other phases. The electric component 24 when acting as a storage unit can be a capacitor, an inductance, a battery or a fuel cell. The use of a segment of an electric power line as a coupling transformer and the use of an apparatus according to the present invention lowers the carrying out costs of a FACTS. The segments with converters can be distributed along a transmission line. This technology offers the advantage of acting only on a portion of the transmitted power on the line. This fraction of affected power depends on the number of segments having converters and on the number of conductors with converters.

The voltage at the terminals of the converters is proportional to the length of the segment and to the current in the phase line. The distribution of the segments with converters along an electric power line reduces the costs of the converters in addition to allowing a serial production of the converters. This distribution of the converters along an electric power line increases the reliability of the system because the loss of a converter does not affect the operation of the other converters located along the line and the other converters continue to modify the power flow through the line with a reduced modulation envelope. Given the fact that the power units according to the present invention can be installed directly on the line, this allows a reduction of the space used on the ground. Preferably, for a segment having three phase lines, an apparatus according to the present invention acts simultaneously on the three phases. However, in certain cases, the apparatus according to the present invention could act only on one or two of the phases, for balancing one or several phases.

The switch 26 that can be a mechanical, electronic or electromechanical switch, can be used for re-establishing the line into its original state when required. In the case of a segment with more than two conductors per phase line, each of the conductors can be linked to a converter or they can be regrouped according to different configurations. For example, for a 735 kV line with four conductors per phase line, one can provide different layouts of simple or double converters that will be presented in reference to FIGS. 2 to 9.

The present invention also provides a method for modifying power flow in a segment of an electric power line. The method comprises step a) of providing a power unit that includes a power converter 18 for converting power between the first and second pairs of terminals 20 and 22, and an electric component 24 connected to the second pair of terminals 22 and capable of circulating power through the power converter. The first pair of terminals is of course connected in series with the conductor 12 of the phase line A of the segment 6. The method also comprises step b) of converting power between the first and second pairs of terminals 20 and 22 by means of the power converter 18 for modifying said power flow in the segment 2. Preferably, the method further comprises step c) of selectively connecting and disconnecting the first pair of terminals 20 in series with the conductor 12 by means of the switch 26, in response to control signals. Preferably, in step a), n−1 power exchange units are provided, in step b), the power is converted by at least one of the n−1 power converters, and in step c), the n−1 power units are connected and disconnected by means of their switch 26 respectively to n−1 conductors of the phase line A of the segment 6.

Figure 2:
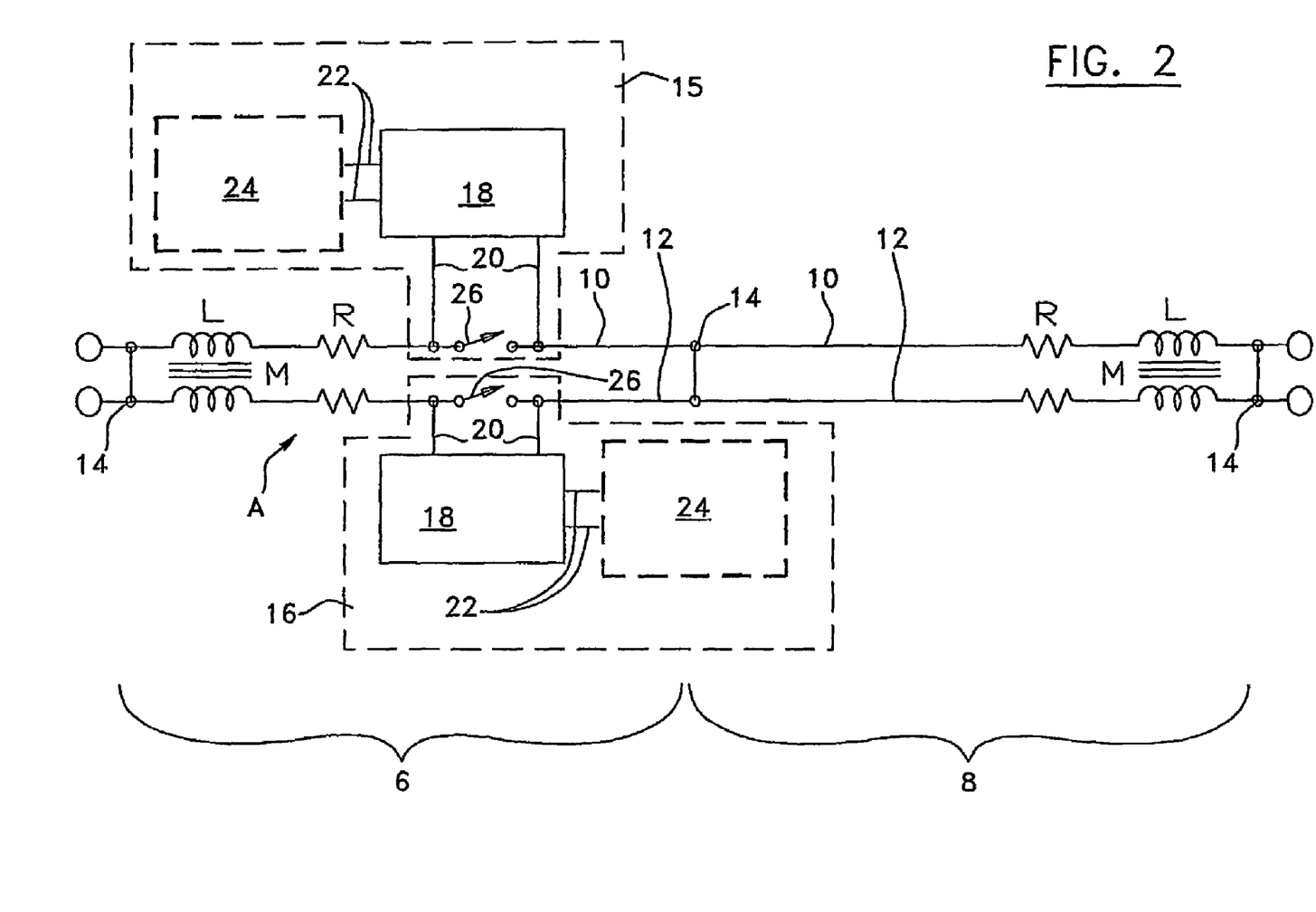
FIG. 2 is a schematic circuit diagram showing two segments of an electric power line, and an apparatus according to a preferred embodiment of the present invention.

Referring now to FIG. 2, the apparatus according to the present invention comprises at least one additional power unit for forming a set of n power units. In this case, the number n is equal to 2. The two power units 15 and 16 are capable of being connected by means of their switch 26 respectively to the two conductors 10 and 12 of the phase line A belonging to the segment 6.

In the present case, for safety reasons, so as to prevent that all the conductors of a same segment open simultaneously, it is important that a same switching device regroup the switches 26 associated to a same phase line. This safety switching device which prevents the simultaneous opening of all the conductors of a same phase line could be for example the one proposed in international patent application published under No. WO 00/35061 corresponding to U.S. Pat. No. 6,396,172 B1.

In the present case, according to the method proposed by the present invention, in step a), an additional power unit is provided for forming a set of two power units 15 and 16; in step b), the power is converted by at least one of the two power converters 18; and in step c), the two power units 15 and 16 are connected and disconnected by means of their switch 26 respectively to the two conductors 10 and 12 of the phase line A of the segment 6. It is worth noting that in the present embodiment, preferably of course, the converter 18 and the electric component 24 of the power unit 15 can be removed from the current flow path by closing the switch 26. The closed switch creates short circuit across the power exchange unit, and the conductor operates as though the power exchange unit is not present. The layout shown in FIG. 2 could de-ice the conductors of the phase lines of the segment 6 and to carry out FACTS functions.

Figure 3:
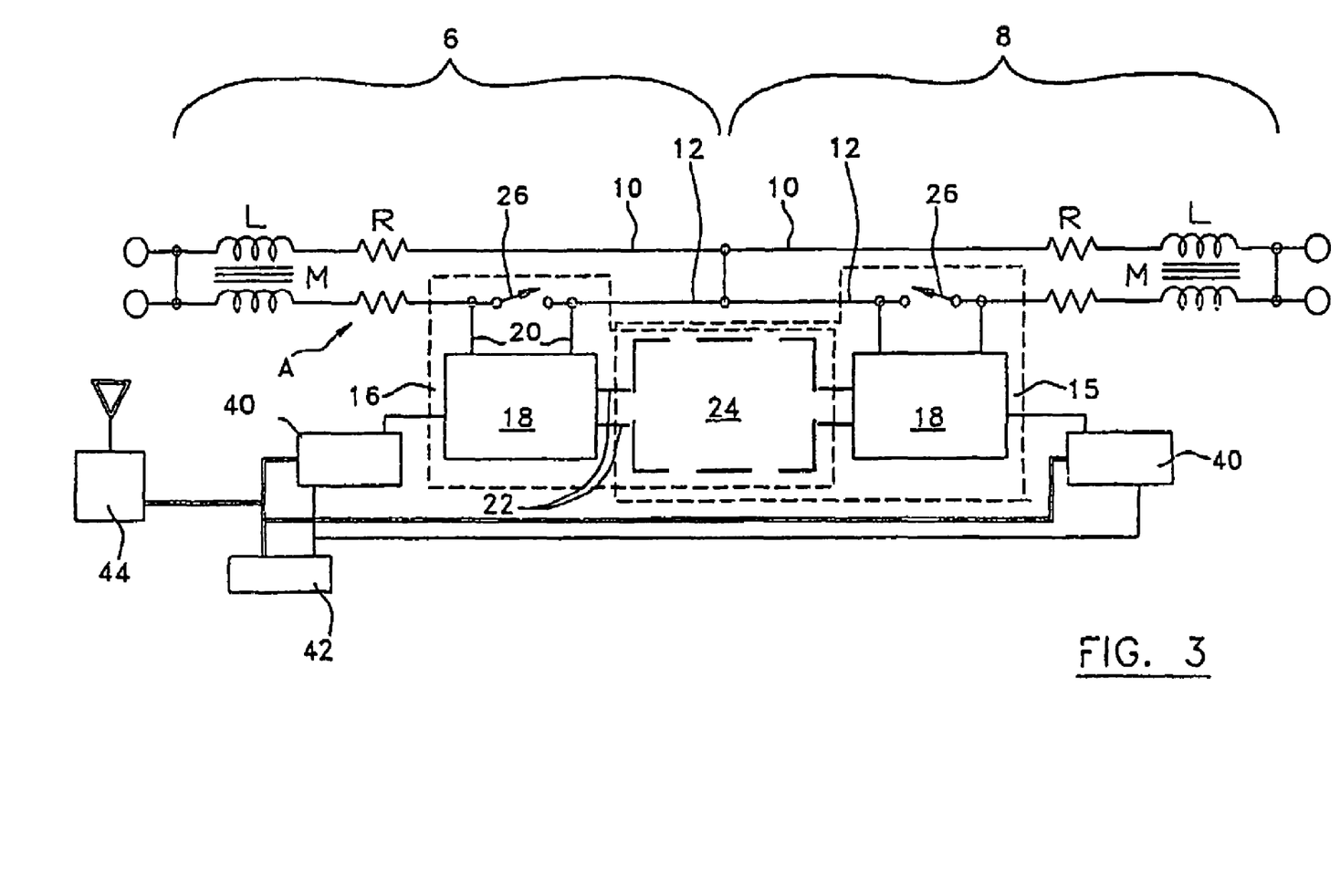
FIG. 3 is a schematic circuit diagram showing two segments of an electric power line, and an apparatus according to a preferred embodiment of the present invention.

Referring now to FIG. 3, the apparatus according to the present invention comprises an additional power unit 15 for forming a set of two power units 15 and 16. The two power units 15 and 16 are capable of being connected by means of their switch 26 respectively to the conductor 12 of the phase line A belonging respectively to the segments 6 and 8. The two power units 15 and 16 share a common electric component 24 for allowing a power flow between the two segments 6 and 8.

In this FIG. 3, are also shown controllers 40, a supply 42, and a transceiver 44. The previously mentioned components with sensors (not shown) control the converters 18 from a control station (not shown) so as to carry out FACTS functions for controlling the power flow in the segments 6 and 8, and as a result controlling the power flow in an electric power network. The supply 42 operates by capacitive coupling or by inductive coupling or with the help of a solar panel or a combination of these components. Of course, the controllers 40, the supply 42 and the transceiver 44 can be used with each of the embodiments shown in FIGS. 1 to 9. These control components, whether the controller 40, the supply 42 and the transceiver 44, is carried out by what is proposed in U.S. Pat. Nos. 6,396,172 B1 and 6,727,604 B2 (continuation in part).

The embodiment shown in FIG. 3 comprises a double converter integrated to a phase line of a transmission line operating at high and very high-voltage. The active or reactive power extracted from the segment 6 is stored in the electric component 24 and injected into the segment 8 with the help of the converter 18 of the power unit 15. The phase, the voltage or current amplitude and the frequency can be controlled independently at the converter 18 of the unit 16 or at the converter 18 of the unit 15 depending on the desired effects. Normally, the terminals 20 are adapted to receive an alternating current and the terminals 22 are adapted to receive a direct current. However, it is not excluded that the terminals 22 may be adapted to receive an alternating current. The active or reactive power could also be inverted and thus travel from the segment 8 to the segment 6 through the converter 18 of the units 15 and 16. In other cases, the two converters can operate in parallel and extract or inject the power of the electric component 24 that may constitute a storage or dissipative module. The two converters and the electric component can be located in the same casings so as to reduce electromagnetic emissions and costs. The system provides the electric network with controlling functions of static or dynamic power flow, to carry out harmonic or subharmonic filtering functions, to carry out dissipative functions, to allow the de-icing of the lines, etc. The converters communicate remotely or through an optical fibre.

The apparatus shown in FIG. 3 can be used for carrying out a non dissipative sub-synchronous filtering. The converter 18 of the unit 16 then extracts from the segment 6 power of the subharmonic in such a way as to reduce this subharmonic and to transfer it to the electric component 24 which, in the current embodiment, is a capacitive storage unit. The converter 18 of the unit 15 then takes this power from the electric component 24 and re-injects it at the frequency of the network in the segment 8.

The apparatus shown in FIG. 3 can be installed on a bus in a junction post of several electric power lines. Thus, in the case where the segments 6 and 8 belong to two distinct power lines, it is possible, with the apparatus shown in FIG. 3, to a transfer power from one of the transmission lines to another.

In the present case, according to the method of the present invention, in step a), an additional power unit is provided for forming a set of two power units 18; in step b), the power is converted by means of two power converters 18; and in step c), the two power units are connected and disconnected by means of their switch 26 respectively to the conductor 12 of the phase line A belonging respectively to the segments 6 and 8, the power units 15 and 16 sharing a common electric component 24 for enabling a power flow between the two segments 6 and 8.

Figure 4:
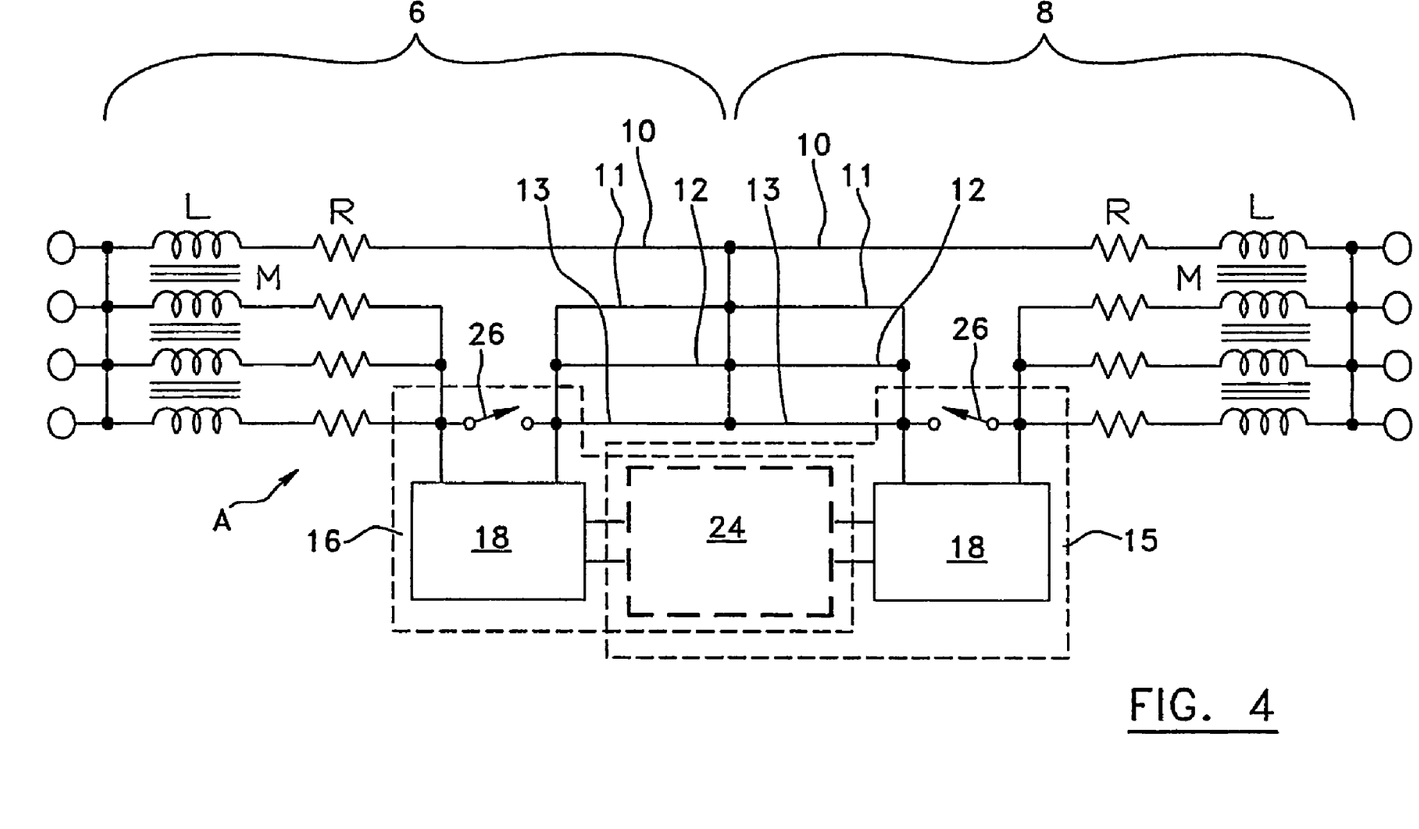
FIG. 4 is a schematic circuit diagram showing two segments of an electric power line, and an apparatus according to a preferred embodiment of the present invention.

Referring now to FIG. 4, the switch 26 of each power unit 15 or 16 is able to connect and disconnect, for the phase line A of the corresponding segment 6 or 8, n−1 conductors. In the present case, the number of conductors being equal to four, three conductors are short-circuited among each other on each side of the corresponding switch. In the present case, according to the method of the present invention, in step c), the switch 26 of each power unit 15 or 16 connects and disconnects, for the phase line A of the segment 6 or 8, three conductors that are short-circuited among each other on each side of the switch.

Figure 5:
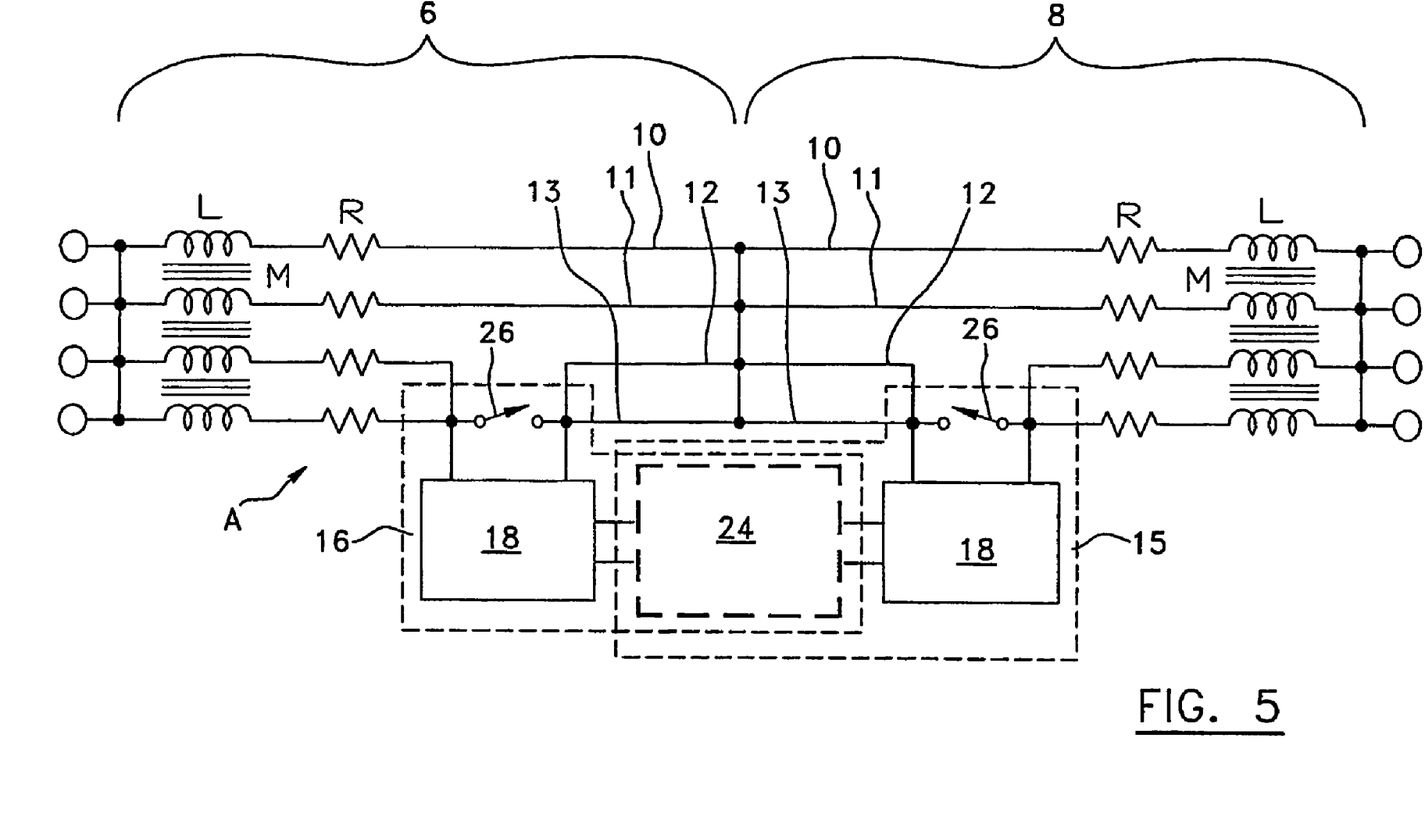
FIG. 5 is a schematic circuit diagram showing two segments of an electric power line, and an apparatus according to a preferred embodiment of the present invention.

Referring now to FIG. 5, the switch 26 of each power unit 15 or 16 is adapted to connect and disconnect, for the phase line A of the corresponding segment 6 or 8, more than one and at most n−1 conductors that are short-circuited among each other on each side of the corresponding switch 26. In the present case, the number of conductors is equal to four, and two of the four conductors are short-circuited among each other on each side of the corresponding switch. In the present case, according to the method of the present invention, in step c), the switch 26 of each power unit 15 or 16 connects and disconnects, for the phase line A of the corresponding segment 6 or 8, two conductors which are short-circuited among each other on each side of the switch 26.

Figure 6:
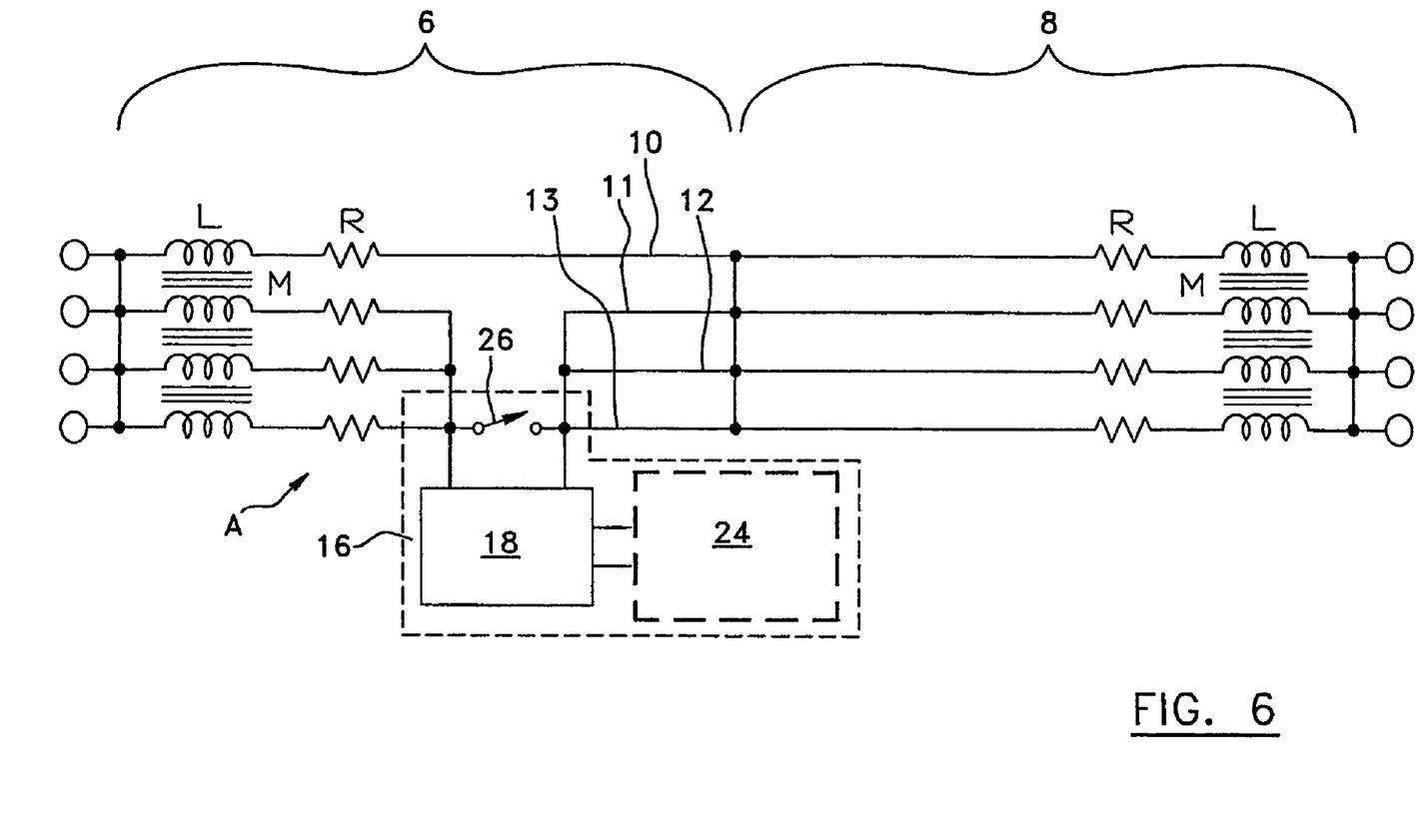
FIG. 6 is a schematic circuit diagram showing two segments of an electric power line, and an apparatus according to a preferred embodiment of the present invention.
Figure 7:
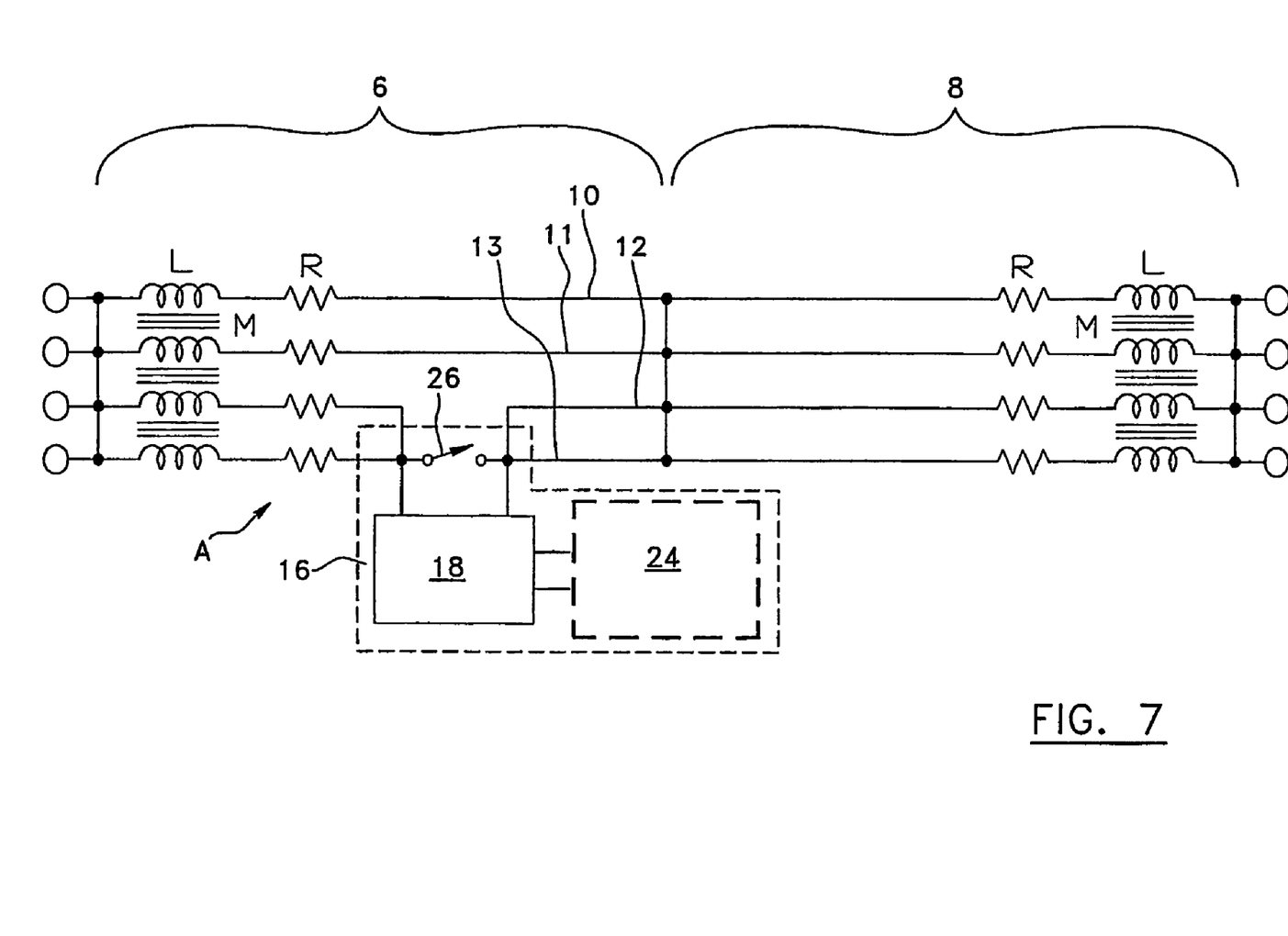
FIG. 7 is a schematic circuit diagram showing two segments of an electric power line, and an apparatus according to a preferred embodiment of the present invention.

Referring now to FIGS. 6 and 7, the switch 26 is adapted to connect and disconnect, more than one and at most n−1 conductors of the phase line A of the segment 6, said more than one and at most n−1 conductors being short-circuited among each other on each side of the switch 26. In the present case, in FIG. 6, there are four conductors, three of the four conductors being short-circuited among each other on each side of the switch 26. In the case of FIG. 7, there are four conductors, but only two of the four conductors are short-circuited among each other on each side of the switch 26. In the present case, according to the method of the present invention, in step c), the switch 26 connects and disconnects three (FIG. 6) or two (FIG. 7) conductors of the phase line A belonging to the segment 6. The three (FIG. 6) or the two (FIG. 7) conductors are short-circuited among each other on each side of the switch 26.

Figure 8:
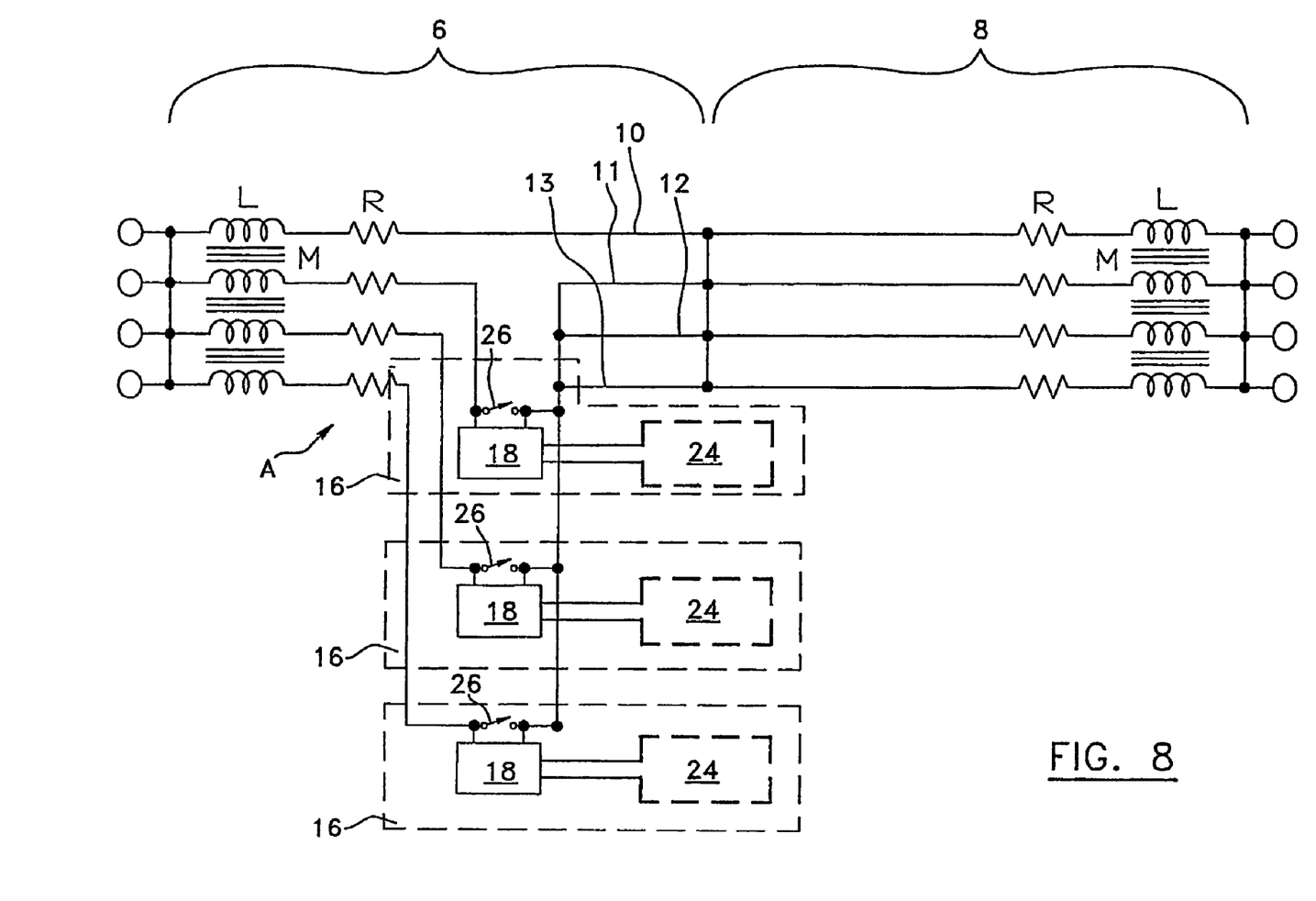
FIG. 8 is a schematic circuit diagram showing two segments of an electric power line, and an apparatus according to a preferred embodiment of the present invention.

Referring now to FIG. 8, the apparatus comprises at least one additional power unit for forming a first set of n−1 power units. In the present case, given the fact that the number of conductors is four, the first set of power units is composed of three units. The switches 26 of the three power units are adapted to connect and disconnect respectively three conductors 11, 12 and 13 of the phase line A belonging to the segment 6. The three conductors 11, 12, and 13 are short-circuited among each other on one side of the switches 26. In the present case, according to the method of the present invention, in step a), two additional power units are provided to form the first set of three power units; in step b), the power is converted by the three power converters 18; and in step c), the three power units 16 are connected and disconnected by means of their switch 26 respectively to the three conductors 11, 12, and 13 of the phase line A belonging to the segment 6, the three conductors 11, 12, and 13 being short-circuited among each other on one side of the switch 26.

Figure 9:
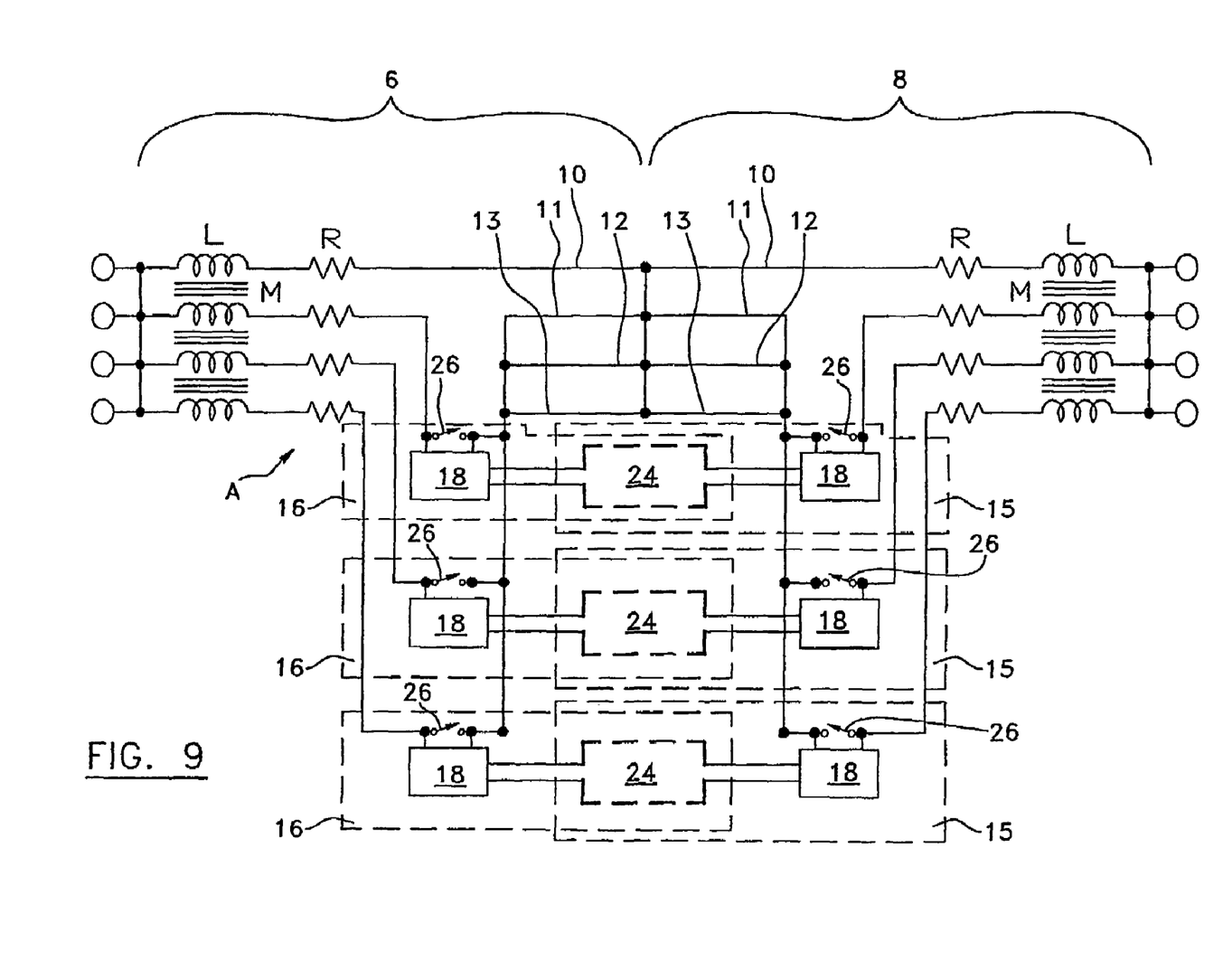
FIG. 9 is a schematic circuit diagram showing two segments of an electric power line, and an apparatus according to a preferred embodiment of the present invention.

Referring now to FIG. 9, the apparatus comprises at least one additional power unit for forming a second set of n−1 power units. In the present case, given the fact that the number n of conductors of the phase line A is equal to four, three additional power units 15 are required for forming the second set of three power units 15. The switches 26 of the three power units 15 of the second set are adapted to connect and disconnect the three conductors 11, 12, and 13 of the phase line A belonging to the segment 8. The three conductors of the phase line A of the segment 8 are short-circuited among each other on one side of the switches 26 of the units 15. The first and second sets of power units 15 and 16 share common electric components 24 to allow a power flow between the two segments 6 and 8.

In the present case, according to the method of the present invention, in step a), three additional power units 15 are provided to form the second set of three power units 15; in step b), the power is converted by at least two of the power converters 18 that belong respectively to the first and second sets and that are linked by a common electric component 24; in step c), the three power units 15 of the second set are connected and disconnected by means of their switch 26 respectively to the three conductors 11, 12 and 13 of the phase line A belonging to the segment 8. The three conductors 11, 12 and 13 of the phase line A of the segment 8 are short-circuited among each other on one side of the corresponding switches 26. Said at least two power converters provides a power flow between the segments 6 and 8.

Figure 10:
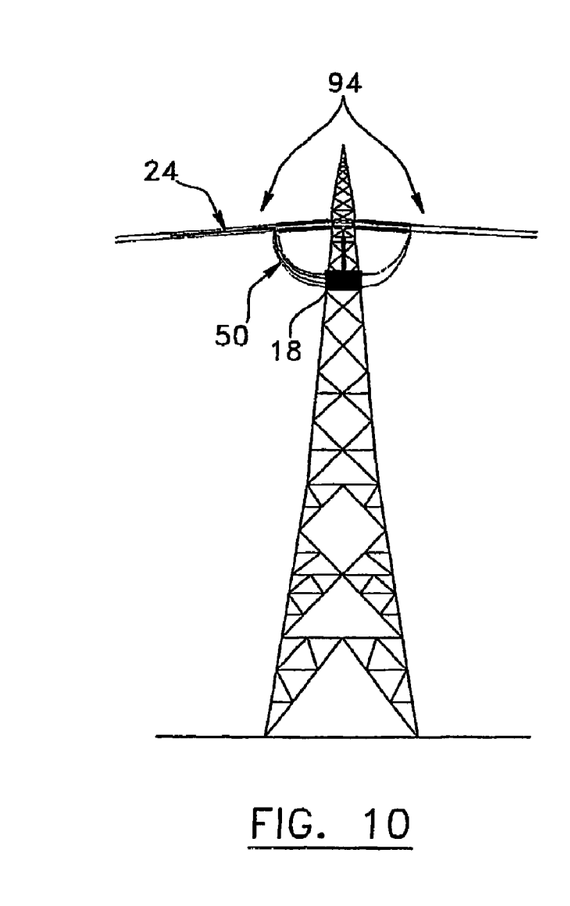
FIG. 10 is a side view of a pylon supporting an electric power line onto which an apparatus according to a preferred embodiment of the present invention is mounted.
Figure 11:
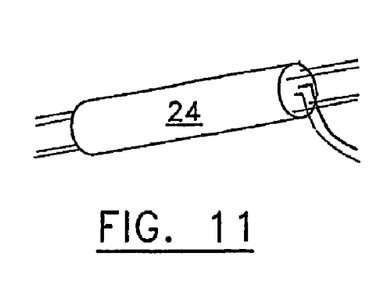
FIG. 11 is a perspective view of a component of the apparatus shown in FIG. 10.
Figure 12:
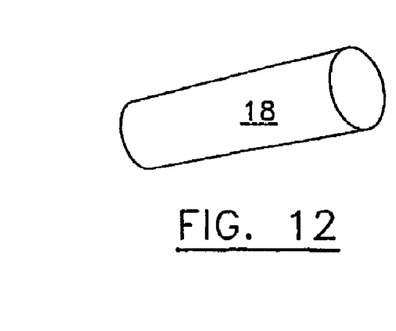
FIG. 12 is a perspective view of another component of the apparatus shown in FIG. 10.
Figure 13:
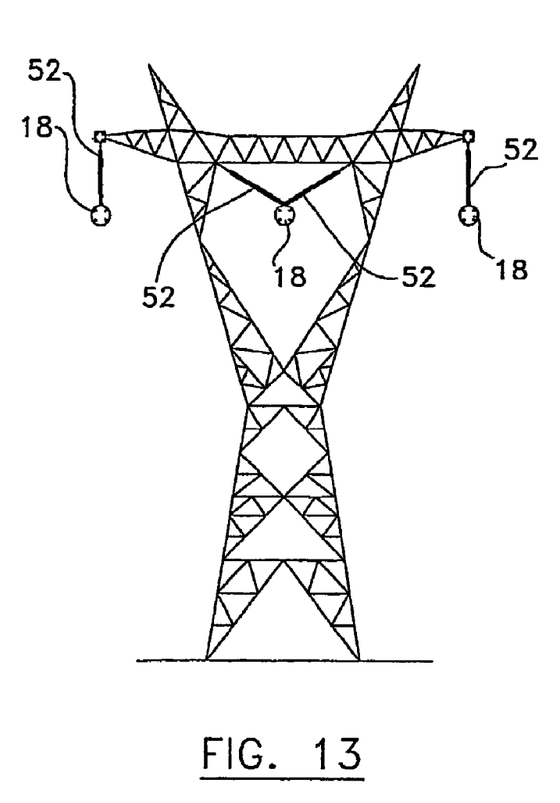
FIG. 13 is a front view of the pylon shown in FIG. 10.

Referring now to FIGS. 10 to 13, there is shown a pylon provided with an apparatus according to the present invention. The converters 18 and the electric component 24 can be mounted as shown in these figures. The converters 18 are supported by supports 52. In FIG. 10, there is shown that the converters 18 do not need to support the mechanical tension that is present in the transmission line 94. Jumpers 50 support the converters 18. The electric components 24, such as capacitors, resistances or batteries when required, can be located within the space defined by the conductors of a phase line of the segment as shown in FIGS. 10 and 11. If the power unit to be installed is relatively large, the use of a platform may be considered.

The invention claimed is:

1. Apparatus for modifying a power flow in a segment of an electric power line, each segment including phase lines each having n conductors, where n is equal to or greater than 2, electrically insulated from one another and short-circuited at ends of the segment, the apparatus comprising a power exchange unit including:
   a power converter for converting power between first and second pairs of terminals, the first pair of terminals being connected in series with at least one of the n conductors of the segment; and
   an electric component connected to the second pair of terminals and capable of circulating power through the power converter for modifying said power flow.

2. Apparatus according to claim 1, wherein the power exchange unit further comprises a switch for selectively connecting and disconnecting the first pair of terminals in series with said at least one conductor of the segment, in response to a control signal.

3. Apparatus according to claim 2, comprising n−1 power exchange units connectable by means of their switch respectively to n−1 of the n conductors of a phase line belonging to the segment.

4. Apparatus according to claim 2, comprising at least one additional power exchange unit for forming a set of n power exchange units, the n power exchange units being connectable by means of their switch respectively to n conductors of a phase line belonging to the segment.

5. Apparatus according to claim 2, comprising an additional power exchange unit for forming a set of two power exchange units, the two power exchange units being connectable by means of their switch respectively to conductors of two phase lines belonging respectively to said segment and to another segment, the two power exchange units sharing a common electric component for allowing a power flow between the two segments.

6. Apparatus according to claim 5, wherein the switch of each power exchange unit is able to connect and disconnect, for the corresponding phase line, n−1 conductors that are short-circuited among each other on each side of the switch.

7. Apparatus according to claim 5, wherein the switch of each power exchange unit is able to connect and disconnect, for the corresponding phase line, more than one and at most n−1 conductors that are short-circuited among each other on each side of the switch.

8. Apparatus according to claim 2, wherein the switch is able to connect and disconnect more than one and at most n−1 conductors of a phase line belonging to the segment, said more than one and at most n−1 conductors being short-circuited among each other on each side of the switch.

9. Apparatus according to claim 2, comprising at least one additional power exchange unit for forming a first set of n−1 power exchange units, the switches of the n−1 power exchange units being able to connect and disconnect respectively n−1 conductors of a phase line belonging to the segment, said n−1 conductors being short-circuited among each other on a side of the switches.

10. Apparatus according to claim 9, comprising at least one additional power exchange unit for forming a second set of n−1 power exchange units, the switches of the n−1 power exchange units of the second set being able to connect and disconnect respectively n−1 conductors of a second phase line belonging to another segment, said n−1 conductors of the second phase line being short-circuited among each other on a side of the corresponding switches, the first and second sets of power exchange units sharing common electric components for allowing a power flow between the two segments.

11. Apparatus according to claim 1, wherein the electric component is selected among the following components: a capacitor, a battery, an inductance, a resistance, and a resistance connected in parallel to a capacitor.

12. Method for modifying a power flow in a segment of an electric power line, the segment having phase lines each having n conductors, where n is equal to or greater than 2, insulated from one another and short-circuited at ends of the segment, the method comprising the following steps:
 a) providing a power unit having a power converter for converting power between first and second pairs of terminals, and an electric component connected to the second pair of terminals and capable of circulating power through the power converter, the first pair of terminals being connected in series with at least one conductor of the n conductors of one of the phase lines; and
 b) controlling the power converter for modifying said power flow.

13. Method according to claim 12, further comprising step c) of selectively connecting and disconnecting the first pair of terminals in series with said at least one conductor of the segment, by means of a switch in response to control signals, said switch being part of the power exchange unit.

14. Method according to claim 13, wherein:
 in step a), n−1 power exchange units are provided;
 in step b), the power is converted by at least one of the n−1 power converters; and
 in step c), the n−1 power exchange units are connected and disconnected by means of their switch respectively to n−1 conductors of a phase line belonging to the segment.

15. Method according to claim 13, wherein:
 in step a), at least one additional power exchange unit is provided for forming a set of n power exchange units;
 in step b), the power is converted by at least one of the n power converters; and
 in step c), the n power exchange units are connected and disconnected by means of their switch respectively to n conductors of a phase line belonging to the segment.

16. Method according to claim 13, wherein:
 in step a), an additional power exchange unit is provided for forming a set of two power exchange units;
 in step b), the power is converted by means of two power converters; and
 in step c), the two power exchange units are connected and disconnected by means of their switch respectively to conductors of two phase lines belonging respectively to said segment and to another segment, the two power exchange units sharing a common electric component for allowing a power flow between the two segments.

17. Method according to claim 16, wherein in step c), the switch of each power exchange unit connects and disconnects, for the corresponding phase line, n−1 conductors that are short-circuited among each other on each side of the switch.

18. Method according to claim 16, wherein in step c), the switch of each power exchange unit connects and disconnects, for the corresponding phase line, more than one and at most n−1 conductors that are short-circuited among each other on each side of the switch.

19. Method according to claim 13, wherein in step c), the switch connects and disconnects more than one and at most n−1 conductors of a phase line belonging to the segment, said more than one and at most-1 conductors being short-circuited among each other on each side of the switch.

20. Method according to claim 13, wherein:
 in step a), at least one additional power exchange unit is provided for forming a first set of n−1 power exchange units;
 in step b), the power is converted by at least one of the n−1 power converters; and
 in step c), the n−1 power exchange units are connected and disconnected by means of their switch respectively to n−1 conductors of a phase line belonging to the segment, said n−1 conductors being short-circuited among each other on a side of the switches.

21. Method according to claim 20, wherein:
 in step a), at least one additional power exchange unit is provided for forming a second set of n−1 power exchange units;
 in step b), the power is converted by at least two of the power converters that belong respectively to the first and second sets and that are linked by a common electric component; and
 in step c), the n−1 power exchange units of the second set are connected and disconnected by means of their switch respectively to n−1 conductors of a phase line belonging to a second segment, said n−1 conductors of the phase line belonging to the second segment being short-circuited among each other on a side of the corresponding switches, said at least two power converters allowing a power flow between the two segments.

* * * * *